United States Patent Office 3,319,647
Patented May 16, 1967

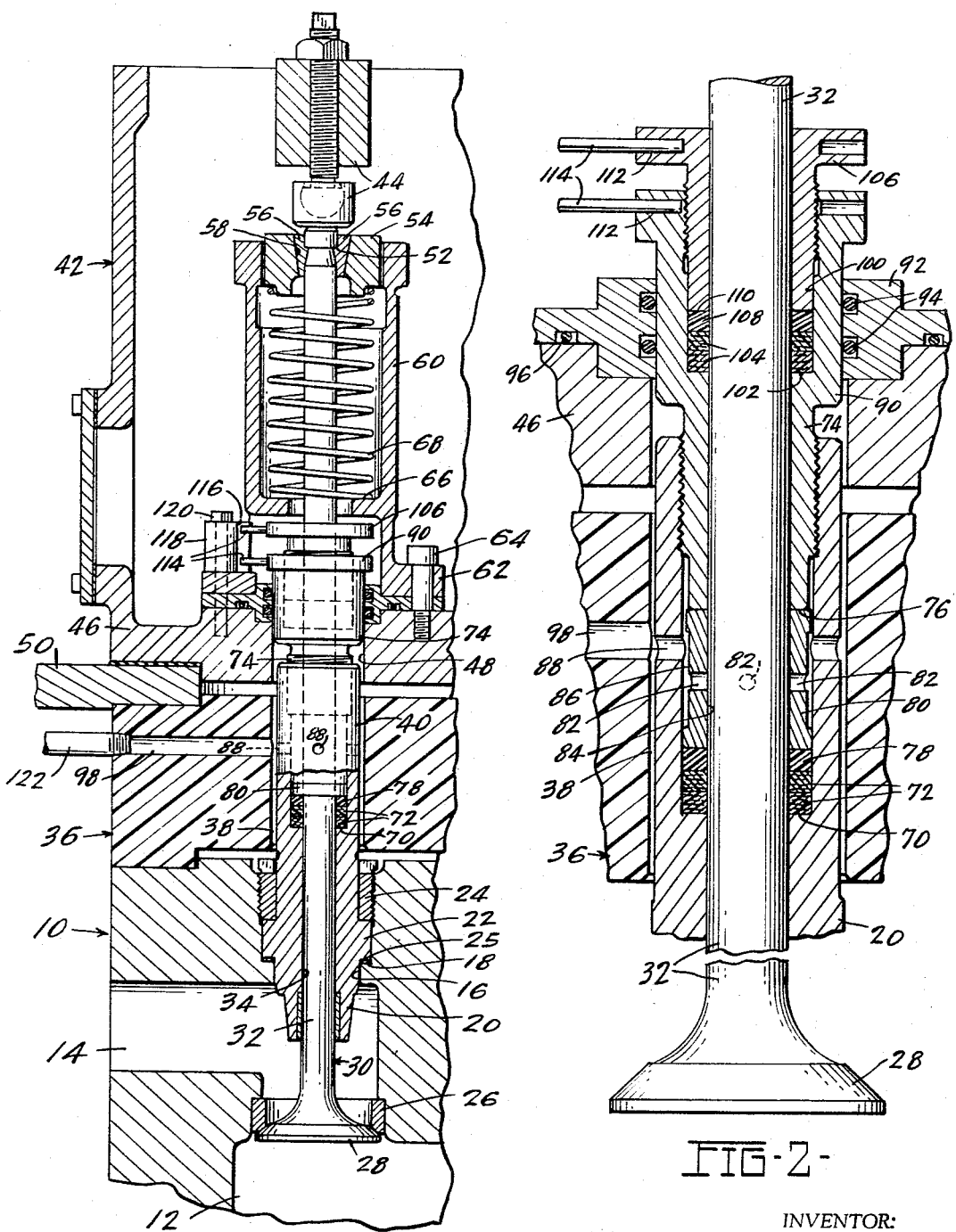

3,319,647
VALVE PACKING CONSTRUCTION FOR VALVES USED AT LOW TEMPERATURES
Willard A. Morain, Mount Vernon, Ohio, assignor to The Cooper-Bessemer Corporation, Mount Vernon, Ohio, a corporation of Ohio
Filed Jan. 17, 1964, Ser. No. 338,348
3 Claims. (Cl. 137—312)

The present invention relates to valve structures for controlling flow of fluids at cryogenic temperatures by means of actuating mechanism that is at a temperature considerably warmer than the temperature of the fluid controlled; and more particularly to a structure for providing a seal with respect to the actuating rod or stem of the valve, which structure includes packing material all of which is located within a short distance of the cryogenic fluids and the inner portion of which is at cryogenic temperatures.

While the present invention will have utility in various types of valve structures for controlling the flow of cryogenic fluids, it has particular utility when used for the control of the flow of gases into and out of the cryogenic expansion engines of the type disclosed in Morain, Ostborg, White, United States patent application Ser. No. 288,235, filed June 17, 1963, and now Patent No. 3,274,-781, entitled Cryogenic Expansion Engine.

In valve structures of this type a packing material is compressed around the valve actuating rod to provide a tight sliding seal with respect to the valve actuating rod. One of the difficulties is that all known packing materials are considerably harder and less pliable at cryogenic temperatures than they are at ambient temperatures, and consequently do not provide as tight a seal at cryogenic temperatures as they do at ambient temperatures.

An object of the prsent invention is the provision of a new and improved valve structure for controlling the flow of fluids at cryogenic temperatures, and in which the primary packing for effecting a sliding seal with respect to the valve actuating rod is located in a structure that is at the cryogenic temperatures.

Another object of the invention is the provision of a new and improved valve structure of the above described type which substantially eliminates all leakage of the cryogenic fluid past the valve actuating rod to the region of the mechanism which actuates the valve rod.

A further object of the invention is the provision of a new and improved valve actuating structure of the above described type which has a first set of packing for effecting a seal with respect to the valve actuating rod and which packing is at a temperature substantially that of the cryogenic fluid, and a secondary set of packing spaced a short distance away from the first set of packing and kept at a warmer temperature than the primary packing by conducting the cold fluid which leaks past the primary packing away from contact with the secondary packing.

A still further object of the invention is the provision of a new and improved valve actuating structure of the above described structure which provides means to allow different compressive forces to be applied to the primary and secondary packing.

The invention resides in certain constructions, and combinations, and arrangements of parts; and further objects and advantages will become apparent to those skilled in the art to which the invention relates from the following description of the preferred embodiment described with reference to the accompanying drawing forming a part of this specification, and in which:

FIGURE 1 is a sectional view of an exhaust valve and accompanying actuating structure for a cryogenic expansion engine and which embodies the present invention; and FIGURE 2 is an enlarged fragmentary sectional view of the packing gland section of the valve structure shown in FIGURE 1.

The embodiment of valve structure shown in the drawing may be used either as the inlet or the exhaust valve in the structure shown and described in the above mentioned Morain et al. application.

The structure shown in the drawing generally comprises a cylinder head 10 forming the top of an expansion chamber 12 from which gases at cryogenic temperatures are exhausted through an L-shaped exhaust passage 14. A longitudinal opening 16 extends between the exhaust passage 14 and the outside surface of the head 10, and the outer end of the opening 16 is enlarged to provide an outwardly facing shoulder 18. A tubular valve guide 20 having a flange portion 22 is positioned in the opening 16 with its flange 22 held in sealing engagement with the shoulder 18 by means of a collar 24 threaded into the outer end of the opening 16. A copper gasket 25 is positioned between the shoulder 18 and collar 24. An annular valve seat member 26 is provided in the sidewalls of the exhaust passage 14 arranged so that the head 28 of a poppet valve 30 abuts against the valve seat member 26 while the stem or actuating rod portion 32 extends outwardly through the central opening 34 of the valve guide 20. An insulating member 36 is clamped in sealing engagement with the outside of the head 10 with an opening 38 generally aligned with the opening 16 in the head 10, and the outer end 40 of the tubular valve guide 20 projects outwardly of the insulating member 36 through the opening 38.

The outer end of the valve stem 32 extends out of the valve guide 20 and projects into a rocker housing 42 where the end of the stem is abutted by a conventional valve rocker 44. The rocker housing 42 is a generally cup-shaped structure whose bottom 46 has an opening 48 aligned with the opening 38, and a cover plate 50 for insulation, not shown, which surrounds the head 10, is sealingly clamped between the bottom 46 of the rocker housing 42 and the insulating member 36. Lubricating oil at generally ambient temperatures is circulated through the rocker housing 42, so that all of the structure within the rocker housing 42 about to be described is at approximately ambient temperature.

In conventional manner, the outer end of the valve stem 32 is provided with an inwardly facing shoulder 52, and an annular spring retainer 54 is retained on the stem by a pair of split valve keepers 56 which seat on the shoulder 52 and the outer surfaces of which are tapered to fit in the matching tapered central opening 58 of the spring retainer 54. The spring retainer 54 is guided in the outer end of an annular valve spring housing 60, whose inner end is flanged as at 62 and fastened to the bottom of the rocker housing 42 by machine screws 64, only one of which is shown. The spring housing 60 has an outwardly facing shoulder 66, and a valve spring 68 is positioned between the shoulder 66 and spring retainer 54 to bias the poppet valve 30 toward its valve seat 26.

It will be seen from the drawings that the distance between the bottom of the rocker housing 42 in which generally ambient temperatures exist, and the head 10 where cryogenic temperatures exist is very short and will in most instances be no more than about 4 or 5 inches. According to the invention there is provided an improved packing structure in the region beneath the bottom portion of the warm rocker housing which will provide an effective seal preventing the cryogenic fluids, which may be hydrogen or helium, from seeping into the rocker housing.

According to the invention and referring especially to FIG. 2, the outer end of the central opening 34 is enlarged to provide an outwardly facing shoulder 70. At least one ring 72, (two are shown), of a packing material (preferably braided Teflon) is positioned adjacent the shoulder 70. A gland nut 74 is threaded into the outer end of the central opening 34 and is provided with an annular inner end 76 adapted to provide a squeezing action upon the packing rings 72. In order that the turning action of the gland nut 74 will not damage the packing rings 72, it is preferable that some type of non-rotating annular ring be provided between the packing 72 and the gland nut 74 to provide a sliding bearing surface for the gland nut 74. In the embodiment shown, a hard ring 78 of Teflon is positioned against the outer surface of the packing 72, and in some instances it may be possible to have the surface 76 abut the ring 78. As shown, however, an annular metal ring 80 is provided between the ring 78 and the surface 76. The ring 80 has a plurality of openings 82 therethrough which communicate its central opening 84, through which the stem 32 projects, to an annular groove 86 in the outer surface of the metal ring 80. Leakage of cold gases past the packing 72 is, therefore, directed to groove 86, and thence through at least one axial opening 88 into the opening 38 in the insulating member 36. The cold gases which flow through the openings 88 are conducted away through a passageway 98 in the insulating member 36 that is positioned generally opposite the openings 88, so that the gases between the passages 98 and O-rings 94 remain substantially stagnant and become partially warmed.

The outer end of the gland nut 74 is enlarged as at 90, and an annular locating plate 92 is clamped between the bottom 46 of the rocker housing 42 and the valve spring housing 60 to provide a close fit with respect to the outside of the enlarged portion 90 of the gland nut 74. O-rings 94 provide a seal between the locating plate 92 and enlarged portion 90, and another O-ring 96 provides a seal between the locating plate 92 and bottom 46 of the rocker housing 42.

The outer end of the central opening 100 that is positioned in the enlarged portion 90 of gland nut 74 is enlarged to provide an outwardly facing shoulder 102. The shoulder 102 is positioned generally opposite the O-rings 94, and at least one ring 104 of a suitable soft packing material, preferably a braided Teflon, is positioned adjacent the shoulder 102. A second gland nut 106 is threaded into the outer end of the opening 100, and a ring 108 providing a sliding surface for the end surface 110 of the gland nut 106 is positioned between the gland nut 106 and the packing 104. The ring 108 shown is similar to the ring 78 and is made of solid Teflon.

Any suitable means may be provided for gripping the gland nuts 74 and 106 to rotate the same and screw them into their receiving bores. As shown, each of the gland nuts are provided with radially extending openings 112 into which pins 114 may be inserted to hold the gland nuts in a tightened position. The outer ends of the pins 114 are received in a groove 116 in a gland nut locking plate 118 which may be held in place as by a machine screw 120.

It will now be seen that the packing 72 is positioned in a very cold region that is subjected directly to the gases at cryogenic temperatures, while the packing 104 is located in a region that will be close to ambient temperatures. Consequently, the packing 72 is considerably harder during operation of the valve structure than is the packing 104. According to the invention, it has been found that a construction wherein a single gland nut is used to compress both the inner packing 72 and the outer packing 104, the inner packing will not be compressed sufficiently to effect a good primary seal when the outer seal is compressed to an optimum load. The construction of the present invention allows a greater force to be applied to the inner packing 72 than is applied to the outer packing 104, so that the inner packing can effect a better seal, and reduce leakage flow through the passage 98 to a minimum. A pipe 122 or other means may be provided to recirculate the leakage gases back into a low pressure region of the system of which the above described valve structure is a part, so that the gases can be reclaimed.

It will also be seen that by conducting the leakage gases which escape past the primary packing 72 away from the packing structure through a passage in an insulating member spaced apart from the secondary packing 104, that the leakage gases past the primary packing do not cool the secondary packing, and that the secondary packing can therefore provide a tighter seal which substantially eliminates leakage into the rocker housing.

While the invention has been described in considerable detail, I do not wish to be limited to the particular embodiment shown and described, and it is my intention to cover hereby all novel adaptations, modifications, and arrangements thereof which come within the practice of those skilled in the art to which the invention relates.

What I claim is:

1. A valve for controlling the flow of fluids at cryogenic temperatures comprising: a body member, a heat insulating member positioned adjacent an external surface of said body member, said body member having a tubular projection extending through said heat insulating member and having an axially extending opening therethrough, a poppet valve having a head within said body member and a valve stem projecting through said opening, an inner packing positioned between said valve stem and the sidewalls of said opening generally opposite said heat insulating member, an outer packing positioned between said valve stem and the sidewalls of said opening generally outwardly of said heat insulating member, first means for adjustably compressing said first packing between said stem and said sidewalls of said opening, second means for adjustably compressing said second packing between said stem and sidewalls of said opening independently of said first means, and passage means connecting the space between said stem and sidewalls of said opening from a point outwardly of said inner packing through said heat insulating member, said passage means opening into said space at a point closer to said inner packing than to said outer packing to cause the space between said point and said outer packing to be stagnant.

2. A valve for controlling the flow of fluids at cryogenic temperatures comprising: a body having a longitudinally extending opening communicating with an external face of said body, a valve seat on the sidewalls of said opening, a valve having a head portion for abutment with said valve seat and a stem extending through said opening, a heat insulating member positioned adjacent said external face of said body, said heat insulating member having an opening therethrough that is generally aligned with said longitudinally extending opening of said body, a tubular valve guide seated in said body and extending externally through said opening in said body and heat insulating member, said tubular valve guide having a central opening through which said stem of said valve extends, said central opening of said tubular valve guide having an enlarged portion adjacent one end and generally opposite said heat insulating member, said enlarged portion having an outwardly facing shoulder, a compressible packing positioned outwardly of said shoulder, a first gland nut positioned around said valve stem and extending externally of said valve guide body for compressing said compressible packing by a squeezing action produced between said shoulder and said first gland nut, conduit means extending through said tubular valve guide and said heat insulating member for conducting leakage past said compressible packing away from said valve, said first gland nut having a central opening with an enlarged portion adjacent one end and generally above said insulating member and through which said valve stem portion extends, said enlarged portion having an outwardly facing shoulder, a second compressible packing positioned outwardly of said shoulder in said first gland nut, and a second gland nut for compressing said second packing by a squeezing action between said shoulder of said first gland nut and said second gland nut.

3. A valve construction for controlling the flow of fluids at cryogenic temperatures comprising: a body having a longitudinally extending opening communicating with an external face of said body, a valve seat on the sidewalls of said opening, a valve having a head portion for abutment with said valve seat and a stem extending through said opening, a heat insulating member positioned adjacent said external face of said body, said heat insulating member having an opening therethrough that is generally aligned with said longitudinally extending opening of said body, a tubular valve guide seated in said body member and extending externally through said opening in said body and heat insulating member, said tubular valve guide having a central opening through which said stem of said valve closure member extends, said central opening of said tubular valve guide having an enlarged portion adjacent one end and generally opposite said insulating member, which enlarged portion has an outwardly facing shoulder, a first compressible packing positioned outwardly of said shoulder, a first gland nut positioned around said valve stem and extending externally of said valve guide body for compressing said first compressible packing by a squeezing action produced between said shoulder and said first gland nut, conduit means extending through said tubular valve guide and said heat insulating member for conducting leakage past said first compressible packing away from said valve, said first gland nut having a central opening with an enlarged portion adjacent one end and through which said valve stem extends, said enlarged portion having an outwardly facing shoulder, a second compressible packing positioned outwardly of said shoulder in said first gland nut, and a second gland nut for compressing said second packing by a squeezing action between said shoulder of said first gland nut and said second gland nut, said second compressible packing being positioned in a region of high temperature relative to and spaced apart from said first compressible packing.

References Cited by the Examiner
UNITED STATES PATENTS

| | | | |
|---|---|---|---|
| 722,219 | 3/1903 | Fielden | 277—60 |
| 1,582,786 | 4/1926 | Rhodes | 277—60 |
| 1,585,087 | 5/1926 | Deems | 277—60 X |
| 3,054,617 | 9/1962 | Mueller | 277—59 X |
| 3,080,144 | 3/1963 | Baker | 251—245 X |
| 3,217,739 | 11/1965 | La Valley et al. | 137—375 |

WILLIAM F. O'DEA, *Primary Examiner.*

R. GERARD, *Assistant Examiner.*